United States Patent [19]

Nakane et al.

[11] Patent Number: 4,866,633

[45] Date of Patent: Sep. 12, 1989

[54] GAS SHUTOFF APPARATUS

[75] Inventors: Shinichi Nakane, Yamatokouriyama; Takashi Uno; Kazutaka Asano, both of Nara, all of Japan

[73] Assignee: Matsushita Electric Industrial Co., Ltd., Kadoma, Japan

[21] Appl. No.: 110,390

[22] Filed: Oct. 20, 1987

[30] Foreign Application Priority Data

Oct. 20, 1986 [JP] Japan .................. 61-248686
Oct. 20, 1986 [JP] Japan .................. 61-248688
Oct. 20, 1986 [JP] Japan .................. 61-248690

[51] Int. Cl.⁴ ............................. G04F 1/00
[52] U.S. Cl. ..................... 364/510; 137/624.11
[58] Field of Search .............. 364/570, 184, 185; 137/624.11; 340/825.14

[56] References Cited

U.S. PATENT DOCUMENTS

| | | | |
|---|---|---|---|
| 4,200,911 | 4/1980 | Matsumoto | 364/510 |
| 4,241,400 | 12/1980 | Kiefer | 364/184 |
| 4,502,842 | 3/1985 | Currier et al. | 417/8 |
| 4,569,012 | 2/1986 | Sekozawa et al. | 364/164 |
| 4,574,871 | 3/1986 | Parkinson et al. | 165/1 |
| 4,589,435 | 5/1986 | Aldrich | 137/102 |
| 4,644,478 | 2/1987 | Stephens et al. | 364/550 |
| 4,718,454 | 1/1988 | Appleby | 137/624.11 |
| 4,729,106 | 3/1988 | Rush et al. | 364/510 |

FOREIGN PATENT DOCUMENTS 2468069  5/1981  France ................. 137/624.11

Primary Examiner—Parshotam S. Lall
Assistant Examiner—S. A. Melnick
Attorney, Agent, or Firm—Cushman, Darby & Cushman

[57] ABSTRACT

A flow rate of a gas is measured by a flow rate measurement means, and when the flow rate exceeds a predetermined reference value, occurrence of an abnormal state such as escape of the gas is detected and a shutoff means is automatically closed by control of a microcomputer, futhermore, "a gas consumption pattern" showing combination of an amount of gas consumption, maximum flow rate and continuous consumption time of a consumer is observed in a predetermined time period, and a reference value of the gas consumption pattern is decided on the basis of the consumption state, moreover, a decision level of abnormal state is varied and set as a new reference values corresponding to the gas consumption pattern.

10 Claims, 24 Drawing Sheets

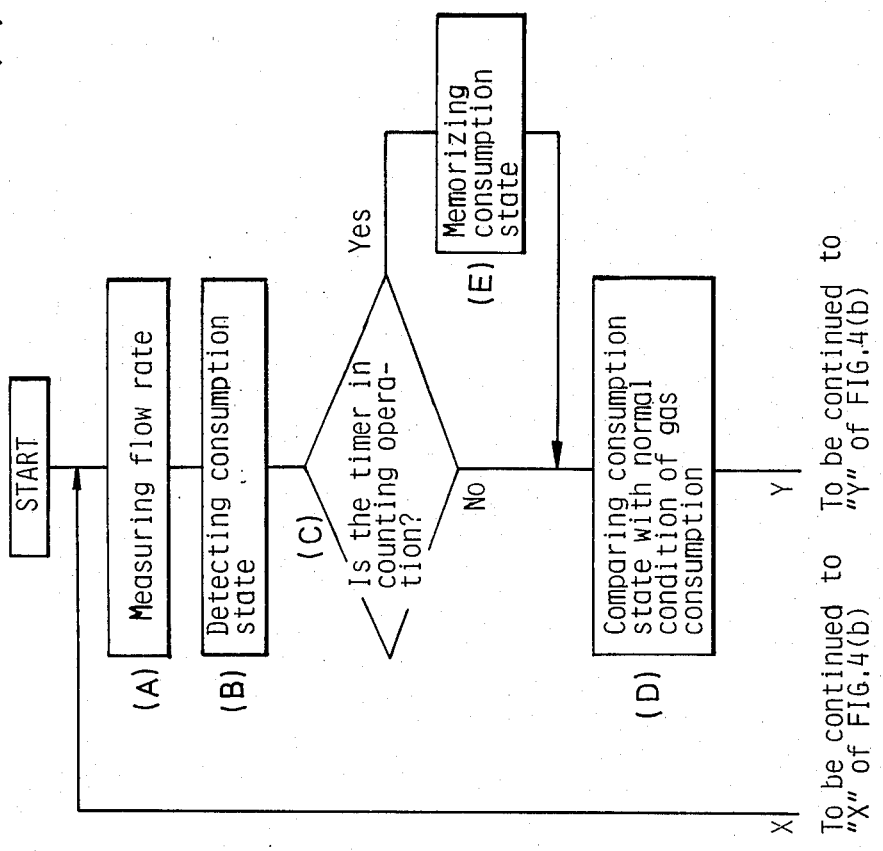

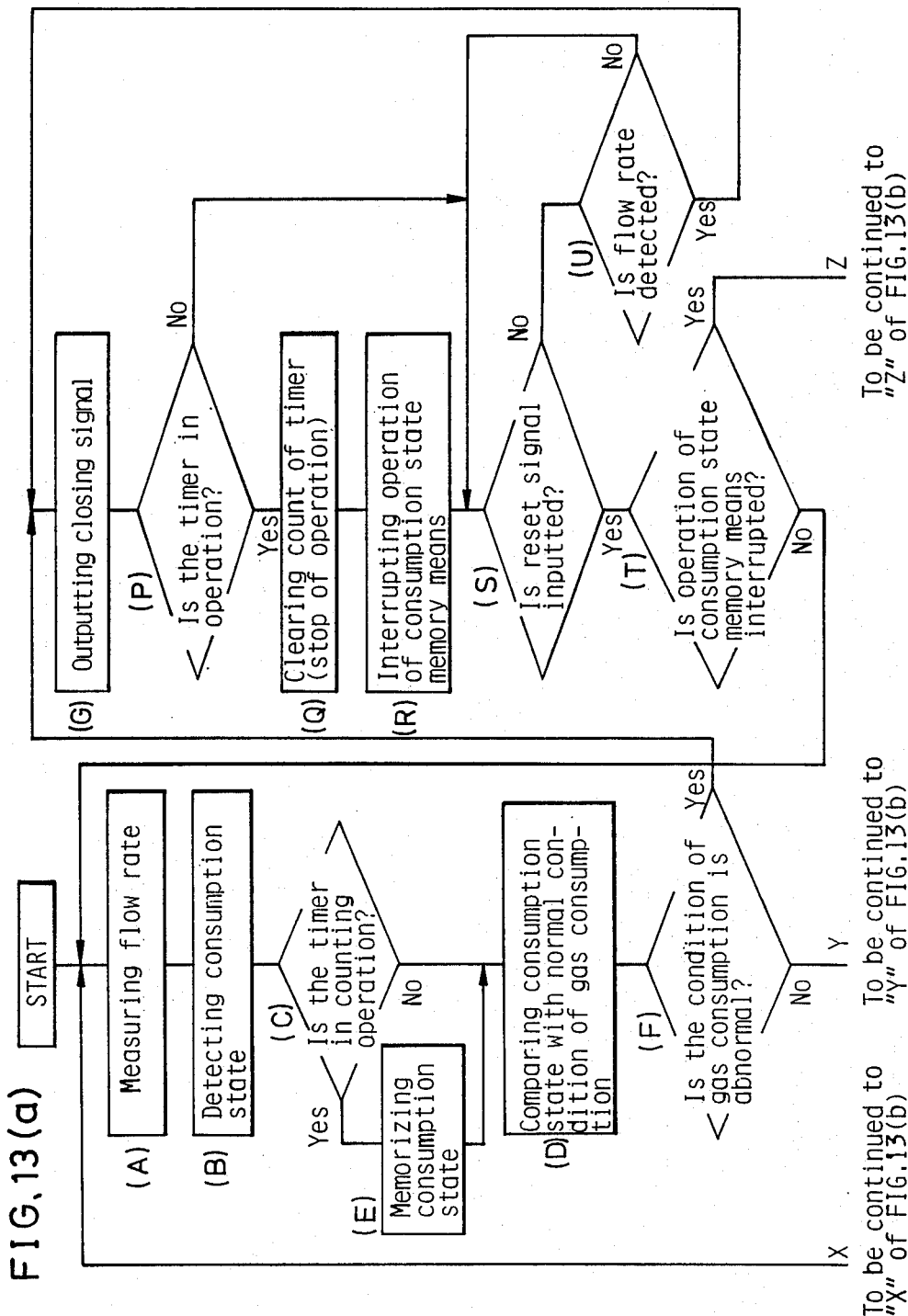

GAS SHUTOFF APPARATUS

FIELD OF THE INVENTION AND RELATED ART STATEMENT

1. FIELD OF THE INVENTION

The present invention relates generally to a gas shutoff apparatus for gas equipment using a town gas or liquefied petroleum gas, and more particularly to gas shutoff apparatus for preventing gas explosion or gas poisoning due to a gas escape from a gas supply tube or gas equipment.

2. DESCRIPTION OF THE RELATED ART

The greater part of gas accidents are caused by escape of unburned gas such as town gas or liquefied petroleum gas (hereinafter is referred to as the gas). The gas escapes when a main cock for supplying the gas to a gas equipment is opened, without burning of the gas, by unexpected disconnection of a rubber tube supplying the gas to the gas equipment or by the rubber tube having cracks thereon and the like. In order to prevent escape of the gas in the prior art, an automatic shutoff valve, a reinforced tube, an alarm to detect the escaped gas and an automatic gas shutoff system which is connected to the alarm are used.

However, the automatic shutoff valve usually cannot be activated under a small flow rate of the escaping gas, and the escape of the gas cannot be interrupted. On the other hand, the gas alarm only generates an alarm so, if a person is absent from there or fails to notice it, the main cock cannot be shut, and dangerous escape of the gas cannot be interrupted. Furthermore, with regard to the automatic gas shutoff system connected to the alarm, implementing such in existing houses is difficult owing to its high cost and necessity of connecting construction. Moreover, the above-mentioned conventional countermeasures are not effective to gas suicide which is liable to cause gas explosion.

In order to improve these defects, recently, a gas shutoff apparatus for preventing gas explosion or gas suicide is manufactured. In such gas shutoff apparatus, a flow rate of the gas is detected and constant and continuous flow of a lot of gas for a long time is recognized as an abnormal state by a microcomputer, for example.

In the above-mentioned conventional gas shutoff apparatus, when the flow rate exceeds a predetermined total flow rate of gas equipments of a consumer, occurrence of an abnormal state is detected and supply of the gas is interrupted (shutoff function at excess of a predetermined total flow rate). In another conventional apparatus, when the flow rate greatly increases and it is detected by a gas meter and when the increased amount is significantly larger than a predetermined flow rate increase of gas equipment having a maximum gas consumption, an abnormal state is detected and supply of the gas is interrupted (shutoff function at excess of a predetermined limit of increase of flow rate). In still another conventional apparatus, when the gas equipment continuously consumes gas without variation of the flow rate, and the time of continuous gas consumption with the flow rate by the gas equipment exceeds a predetermined time period which is decided correspondingly to average normal consumption rate thereof, the state is detected as an abnormal state and supply of the gas is interrupted (gas shutoff function at excess of a predetermined continuous use time).

The respective predetermined reference values of these "total flow rates", "limit of increase of flow rate" and "continuous use time" are decided, for example, corresponding to a rated measurement capacity in the respective gas meters (Example 1). In another example, a gas meter is designed to have plural reference values selected corresponding to a flow rate of a consumer (Example 2).

In the above-mentioned gas shutoff apparatus, the predetermined reference value of the flow rate and the consumption time must be decided on the basis of estimation or result of investigation with respect to a total flow rate of the gas equipments and a consuming pattern of the consumer provided with the gas meter. However, selecting the predetermined reference values in the gas meter has the problems mentioned below.

1. In gas meters having predetermined reference values of the flow rate and/or use time, it is important to select an appropriate gas meter having suitable reference values for the consumers among a number of gas meters of different characteristics, in installing the gas meter. If a gas meter of under-capacity is selected, wherein the reference values are smaller for that consumer, gas is liable to be uselessly interrupted though usage is in normal flow rate. On the contrary, if a gas meter of over-capacity of the reference values is installed, wherein the respective reference values are larger than suitable reference values for the consumer, the gas is liable to fail to be interrupted even when the interruption of the gas is required. Therefore, there is a grave problem in the safety aspect of guessing suitable reference values for each consumer.

Further, for manufacturers of the gas meter, multiple fabrication designs of the gas meters, corresponding to the various reference values, are necessary. Therefore, the fabrication cost is expensive and the consumers are forced to buy expensive apparatus. In the case that additional gas equipment is introduced to the consumer's house by, for example, the purchase of new gas equipment, after the installation of a gas meter having a reference value suited to the original gas equipment, the gas meter must be replaced with a gas meter having a reference value reflecting the change in gas equipment. Such change of the gas meter is very troublesome to the consumers.

2. There is a proposal that a gas meter be equipped with a switch for changing the selection of suitable reference values by switching between a plurality of programs having various reference values for a consumer grouped in a consuming pattern showing a type of gas consumption. In such a system, an operation for selecting a program is necessary, and the respective flow rates of all gas equipments of the consumer must be measured.

Classifying into many subdivisions of the consuming pattern results in the most suitable gas meter being mounted for each consumer. However, a large memory for memorizing many programs of the subdivided consuming patterns is required for such system, and such large capacity memory can not be satisfied by that of a microcomputer which is driven by a battery. Furthermore, a lot of switches for switching the subdivided consuming patterns are required and the switching operation thereof becomes complicated. Further, the number of switches increases the risk of malfunction or switch failure for periods of time. Therefore, the subdivided number of the consuming patterns is to be restricted to three patterns or so in the conventional meters.

OBJECT AND SUMMARY OF THE INVENTION

An object of the present invention is to provide a gas shutoff apparatus which is adaptable to various consumers of a town gas or liquefied petroleum gas. The apparatus uses a microprocessor-based circuit to continually monitor the individual gas demand for a particular consumer. The actual gas usage for any predetermined time period is then automatically and manually compared with the individual consumer's expected demand level. The apparatus is adjustable to accommodate for changes in gas demand due to, for example, an addition, change or deletion in the consumer's gas equipment.

If the actual use exceeds the expected demand during the predetermined time period, the apparatus will treat the exceedance as resulting from a gas leak and will shut off the gas line to prevent further risk of gas explosion or gas poisoning.

The gas shutoff apparatus in accordance with the present invention comprises:

flow rate measurement means for generating a flow rate signal corresponding to a flow rate of a gas in a gas supply tube, consumption state detection means for detecting a consumption state given by the flow rate signal and a consumption time of the gas on the basis of the flow rate signal, initial condition setting means for setting a normal condition of gas consumption shown by said flow rate and consumption time as an initial value, normal condition decision means of gas consumption for deciding whether it is in normal condition and for generating a shutoff signal at deviation of the consumption state from the normal condition of gas consumption, timer means for measuring a predetermined time period, starting signal generating means for starting the timer, consumption-state memory for memorizing the consumption state of the gas on the basis of the flow rate signal during operation of the timer, varying means of normal condition of gas consumption for varying the normal condition of gas consumption corresponding to the consumption state in the consumption-state memory, and shutoff means for interrupting the gas supply at generation of the shutoff signal.

In the gas shutoff apparatus in accordance with the present invention, when a flow rate of the gas during an operation of the timer exceeds the maximum value memorized in advance, data in the consumption-state memory is rewritten. Furthermore, when the operation of the timer has finished, the reference value of the flow rate is changed to a new reference value corresponding to the maximum value of a flow rate memorized in the consumption-state memory. In a similar manner, the reference value of the use time period is changed to a value corresponding to data obtained in the time period of the timer.

BRIEF DESCRIPTION OF THE DRAWINGS

FIG. 4(a), FIG. 4(b) and FIG. 4(c) show a flow chart showing an operation of the controller wherein FIG. 4(c) show disposition of FIG. 4(a) and FIG. 4(b);

FIG. 13(a), FIG. 13(b) and FIG. 13(c) show a flow chart showing an operation of the controller of the forth embodiment wherein FIG. 13(c) shows disposition of FIG. 13(a) and FIG. 13(b);

FIG. 15(a), FIG. 15(b) and FIG. 13(c) show a flow chart showing an operation of the controller of the fifth embodiment wherein FIG. 15(c) shows disposition of FIG. 15(a) and FIG. 15(b);

DESCRIPTION OF THE PREFERRED EMBODIMENTS

Figure 1:
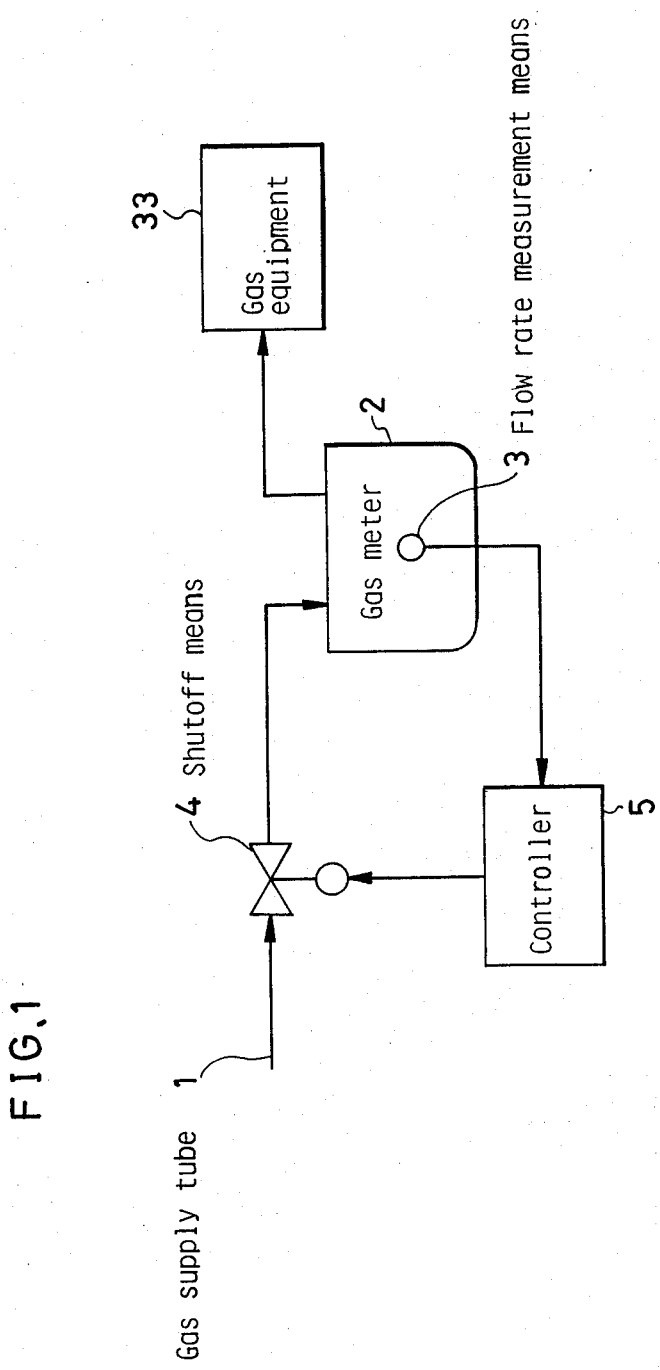
FIG. 1 is a block diagram showing a principle of an embodiment of a gas shutoff apparatus in accordance with present invention.

FIG. 1 is a block diagram showing a principle of a constitution of a gas shutoff apparatus in accordance with the present invention. Gas equipment 33, such as a gas range or gas heater, is connected to a gas supply tube 1 through a shutoff means 4 and a gas meter 2 containing flow rate measurement means 3, such as a belows type digital gas flow rate meter, therein. The shutoff means, such as a known electromagnetic gas shutoff valve 4, is disposed between the gas supply tube 1 and the gas meter 2 and is controlled by a controller 5, such as an electronic circuit or a microcomputer receiving a flow rate signal from the flow rate measurement means 3.

Figure 2:
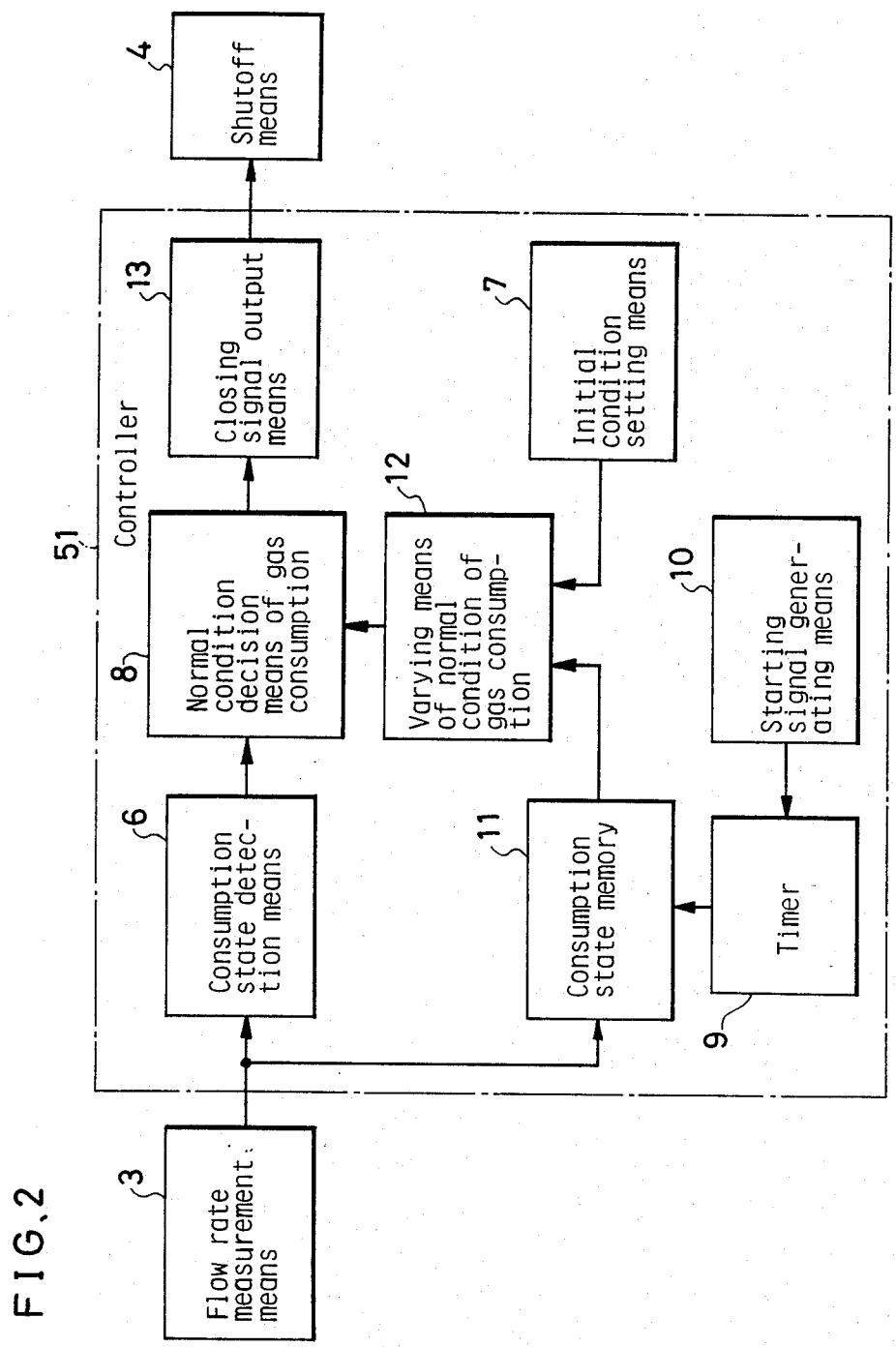
FIG. 2 is a block diagram of a controller in a first embodiment.

FIG. 2 is a block diagram of a first embodiment comprising a controller 51 in the present invention. Referring to FIG. 2, the flow rate measurement means 3 detects a flow rate of a town gas or liquefied petroleum gas (hereinafter referred to as the gas) flowing from the gas supply tube 1 to the gas equipment 33, and generates a flow rate signal corresponding to the flow rate. A consumption state detection means 6 detects "a consumption state" as shown from a flow rate and consumption time of the gas on the basis of the flow rate signal. The consumption state is thus an indication of the level of a consumer's gas usage during an immediate time period. "A normal condition of gas consumption" showing reference values of the flow rate and consumption time of the gas is set in an initial condition setting means 7 such as manual ten-key input device as an initial value thereof. The normal condition of gas consumption is thus the expected demand level of gas usage for the time period in which the consumption state was detected. The normal condition of gas consumption is input to a varying means of normal condition of gas consumption 12 and is set therein. A normal condition decision means of gas consumption 8, which is e.g. a comparator or value comparing step of a microcomputer, outputs a shutoff signal by decision of abnormal condition when an output signal of the consumption state detection means 6 deviates from the normal condition of gas consumption. A timer 9 measures a predetermined time period by a starting signal from a starting signal generating means 10. A consumption-state memory 11 memorizes the consumption state on the basis of the flow rate signal from the flow rate measurement means 3 during an operating period of the timer 9. The varying means 12 of normal condition of gas consumption varies the normal condition of gas consumption set therein corresponding to data in the consumption-state memory 11. A shutoff signal output means 13 outputs a closing signal for closing the shutoff means 4 on the basis of a shutoff signal from the normal condition decision means of gas consumption 8.

When the timer 9 receives a starting signal by operation of the starting signal generating means 10, for example, a push-button switch or an input signal from an outer device (not shown), the timer 9 starts measuring a time period. The time period is selected as two weeks or one month, for example. Then an amount of the gas consumption, maximum flow rates of the respective gas equipment and a continuous time of the gas consumption, which are measured by the flow rate signal of the flow rate measurement means 3, are memorized in the consumption-state memory 11 from the start of the timer 9. A combination of the amount of gas consumption per a predetermined time period, the maximum flow rates and the continuous consumption time, is commonly called "a gas consumption state". Memorized data in the consumption-state memory 11 gives the gas consumption state. The maximum value of the gas consumption state is memorized in the varying means of normal condition of gas consumption 12. The memorized data is compared with the data of the initial condition set in the initial condition setting means 7 in the varying means of normal condition of gas consumption 12, when the counting operation of the timer 9 has finished. Subsequently, the smaller one of both data is selected and is set in the varying means of normal condition of gas consumption 12 as a new normal condition of gas consumption. Namely, during the counting operation of the timer 9, a consumption state showing a value of the flow rate and consumption time of the gas at the present time is monitored. The consumption state is then compared with the initial condition in the normal condition decision means of gas consumption 8. After once setting the new normal condition of gas consumption in the varying means of normal condition of gas consumption 12, the consumption state is compared with the new normal condition of gas consumption.

When a gas consumption state exceeds the normal condition of gas consumption, the shutoff signal is output from the normal condition decision means of gas consumption 8, and the closing signal output means 13 outputs the closing signal to the shutoff means 4. The shutoff means 4 is driven to interrupt the gas in response to the closing signal.

Figure 3:
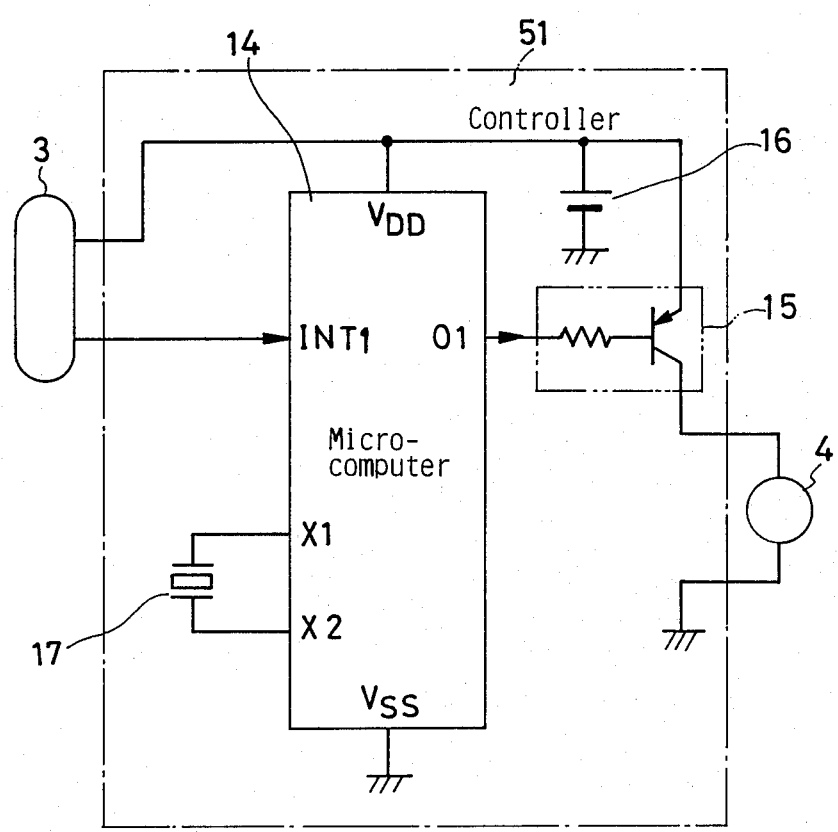
FIG. 3 is a circuitry of the controller in the first embodiment.

The controller 51 is preferably constituted by a microcomputer. A detailed circuit of the controller 51 is shown in FIG. 3. Referring to FIG. 3, the flow rate signal from the flow rate measurement means 3 is input to the interruption input terminal INT1 of the microcomputer 14. The shutoff signal is output from an output terminal $O_1$ and is input into the shutoff means 4 through a driver circuit 15. Since a battery 16 is used as a power source in the embodiment, a shutoff valve of a one shot holding type is used as the shutoff means 4. The shutoff valve of the one shot holding type is advantageous sinse it consumes little electric power in operation thereof. A system clock oscillator 17 is connected to terminals X1 and X2 of the microcomputer 14.

Figure 4B:
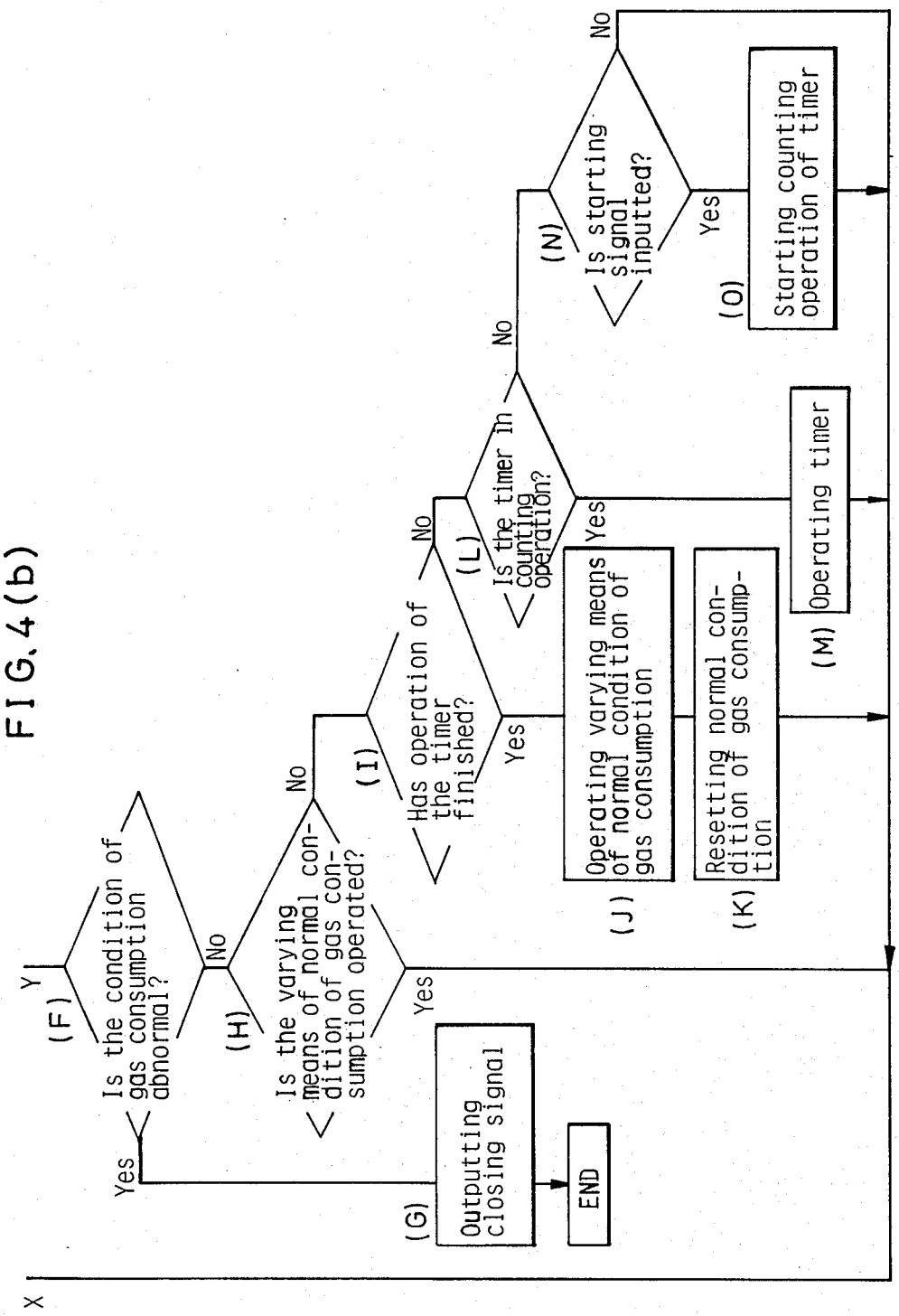

FIG. 4(a) and FIG. 4(b) show a flow chart of the microcomputer 14. The flow rate is measured by the flow rate measurement means 3 (Step A). The consumption state is detected by the consumption state detection means 6 (Step B). Operation of the timer 9 is examined by the starting signal generating means 10 (Step C). When the timer 9 is in operation, the consumption state is memorized in the consumption-state memory 11, and the consumption state is replaced with a new maximum consumption state (Step E). When the starting signal generating means 10 is not operated and the timer 9 is also out of operation, the consumption state detected by the consumption state detection means 6 is compared with the normal condition of gas consumption in the normal condition decision means of gas consumption 8 (Step D). As a result, when the consumption state is over a predetermined normal condition of gas consumption, a closing signal is output from the closing signal output means 13 (Step F and G). Meanwhile, when the consumption state is within the normal condition of gas consumption, if the varying means 12 of normal condition of gas consumption is operated (Step H), the operation of the program is returned to Step A, and measurement of the flow rate is repeated. In case the varying means of normal condition of gas consumption 12 is not operated in the normal condition of the gas consumption, when the counting operation of the timer 9 finished, the varying means of normal condition of gas consumption 12 is operated (Steps I and J).

Furthermore, the maximum value of the consumption state, memorized in the memory means of consumption state 11, is compared with the initial condition of the initial condition setting means 7, and the smaller one thereof is memorized in the varying means of normal condition of gas consumption 12 (Step K).

The maximum values of the consumption state are multiplied by a predetermined safety factor in an actual apparatus.

After the above-mentioned varying process of the normal condition of gas consumption, a consumption state, detected by the consumption state detection means 6, is compared with the modified new normal condition of gas consumption (Step D). Then, the completion of the counting operation of the counter 9 is examined (Step L). When the timer 9 is in the counting operation, the flow of the flow chart is returned to Step D through Step M. Meanwhile, when the timer 9 has finished the time counting operation, the input of a starting signal is examined (Step N). The time counting operation of the timer 9 is started by the input of the starting signal (Step O). When the starting signal is not input, the flow of the flow chart is returned to Step A.

Figure 5:
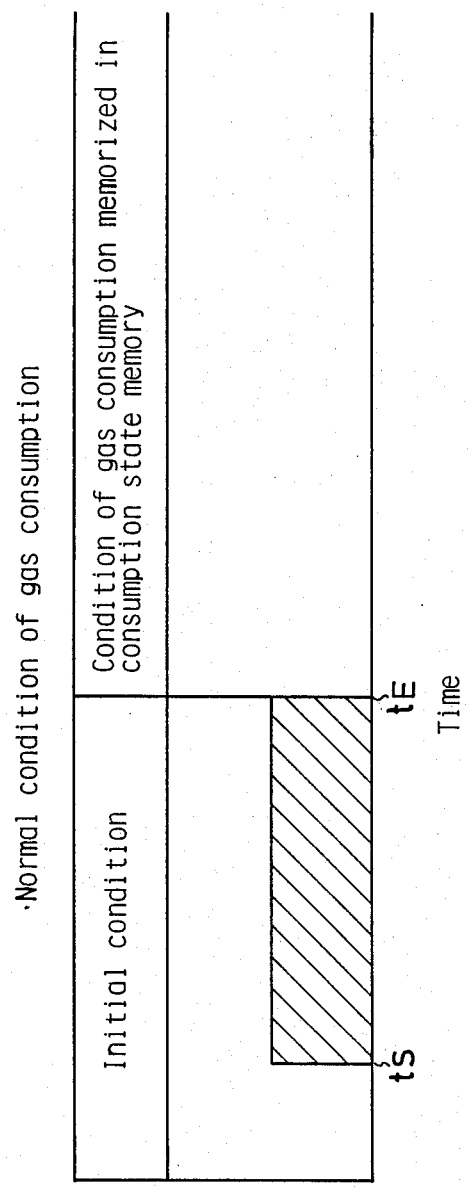
FIG. 5 is a timing chart showing an operation of a timer as shown in FIG. 2.

FIG. 5 is a timing chart showing the operation of the timer 9. Referring to FIG. 5, the abscissa is graduated by time, and the ordinate is graduated by the normal condition of gas consumption. A starting signal is input to the timer 9 at a time $t_S$ and a counting operation starts. Then, the counting operation finishes at a time $t_E$. The gas consumption state is observed in the time period from the time $t_S$ to time $t_E$ as shown by hatching. The initial condition set in the initial condition setting means 7 is used as a reference value until the time $t_E$. After the time $t_E$, as mentioned above, the normal condition of gas consumption is renewed in the varying means of normal condition of gas consumption 12.

The technical advantages of the embodiment in accordance with the present invention are mentioned below. The consumption state is always monitored and is compared with the normal condition of gas consumption. Therefore, when the consumption state deviates from the normal condition of gas consumption by the escape of gas or by forgetting to extinguish a gas stove, for example, supply of the gas is interrupted by the operation of the shutoff means. As a result, gas explosion or gas poisoning can be prevented in a preliminary stage. Furthermore, since the actual gas consumption state of each consumer is observed during a predetermined time period, and the consumption state is renewed by the observation data, a specific gas consumption state of the consumer is introduced into the gas shutoff apparatus. Safety in use of gas equipment is thus further improved.

Figure 6:
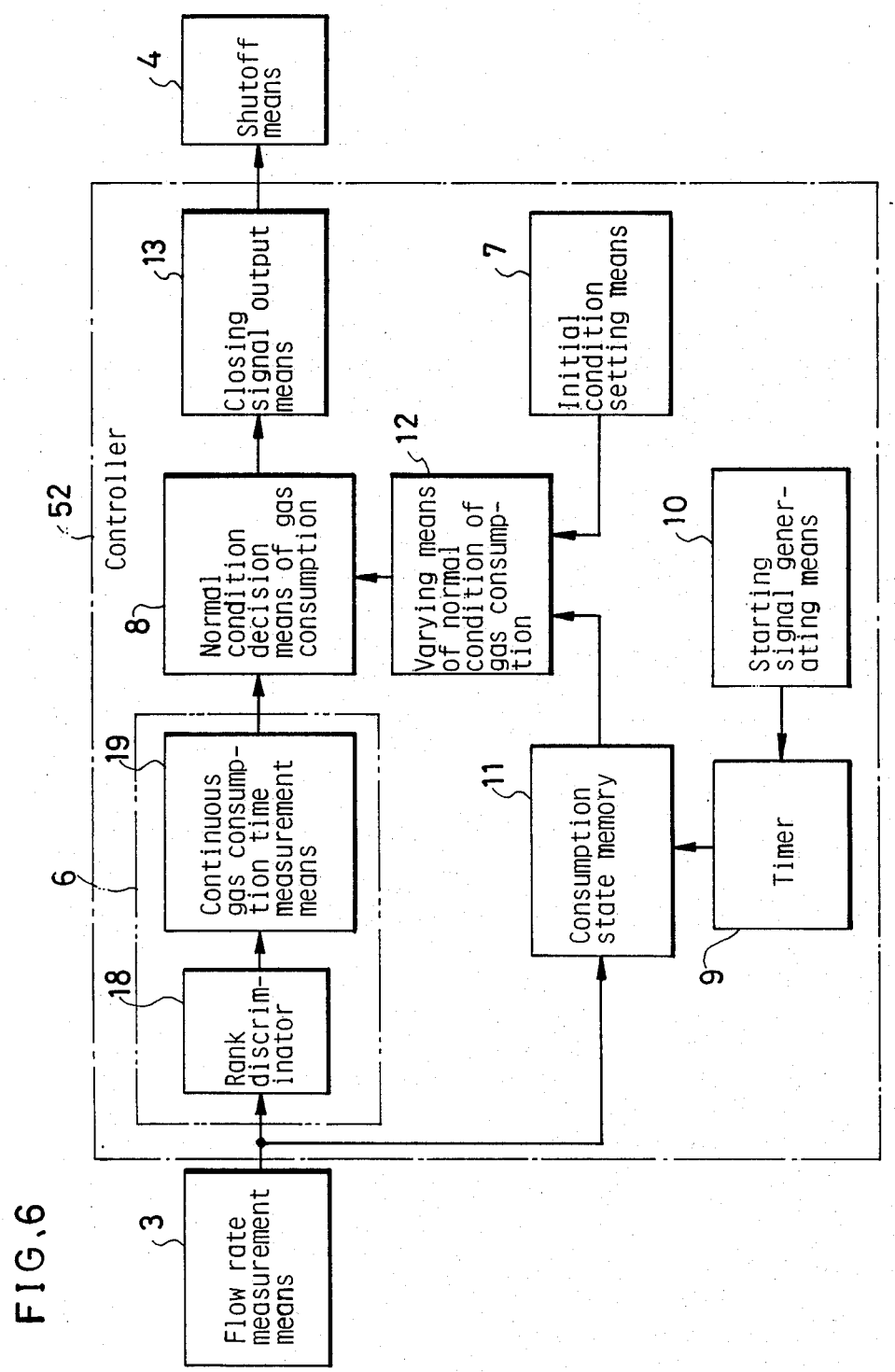
FIG. 6 is a block diagram of a controller in a second embodiment.

FIG. 6 is a block diagram of a second embodiment of the present invention. Referring to FIG. 6, means having the same reference numerals as shown in FIG. 2 are identical with that of FIG. 2, and hence the same descriptions thereof are applied. A consumption state detection means 6 further comprises a rank discriminator 18 and a continuous operation time measurement means 19 for measuring the time of nonstop operation of gas equipment. In the embodiment, a range of flow rates of the gas is divided into plural ranks, and the rank of a flow rate is decided by the rank discriminator 18.

Furthermore, the continuous operation times with respect to the respective ranks of flow rate are measured by the continuous operation time measurement means 19. Respective allowable times for continuous operation with respect to the respective ranks of flow rate are set in the initial condition setting means 7 as initial conditions. A maximum value of the continuous operation times of the respective ranks of flow rate during operation of the timer 9 are memorized in the consumption-state memory 11. When the counting operation of the timer 9 has finished, the maximum value of the respective continuous operation times with respect to the respective ranks of flow rate, memorized in the consumption-state memory 11, are given to the continuous operation time measurement means 19 as data. The data of the respective ranks of the flow rate are compared with the respective allowable time set in the initial condition setting means 7. The shorter times in respective ranks of flow rate are then selected in the continuous operation time measurement means 19. The resultant continuous operation times, selected as mentioned above, are set in the continuous operation time measurement means 19 as new total operation times with respect to the respective ranks of flow rate. Thereafter, the signal from the rank discriminator 18 is decided on the basis of the new continuous operation time.

In an actual operation of the gas shutoff apparatus, the continuous operation time can be multiplied by a predetermined safety factor.

Figure 7:
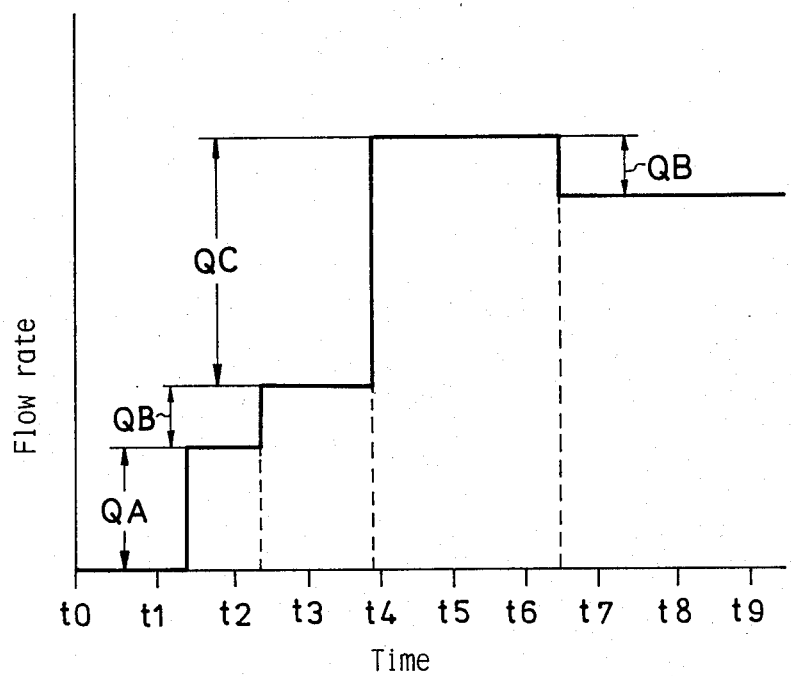
FIG. 7 is a graph showing a relation between a time and a flow rate of the gas.

FIG. 7 is the graph showing a gas consumption in an actual consumer using a plurality of gas equipments. Flow rates of the respective gas equipments such as a gas heater or a gas range are generally different from each other. Referring to FIG. 7, the abscissa is graduated by time and the ordinate is graduated by flow rate. Times $t_0, t_1, \ldots t_9$ are sampling times having a predetermined constant time interval. No gas equipment is used at time $t_1$, and the flow rate is zero. A flow rate QA is detected at the time $t_2$ in the consumption state detection means 6. Then, a rank of the flow rate QA is decided and the operation time with respect to the flow rate QA is measured. Subsequently, the flow rate increases and is sampled at the sampling time $t_3$. The increment of flow rate QB is detected, and then an operation time with respect to the increment of flow rate QB is measured. In the similar manner, measurement of the operation time with respect to the flow rate QC is commenced at the sampling time $t_4$. Then, the following flow rate decrease was measured at the sampling time $t_7$, with the decrease in flow rate of QB being detected. From the graph of FIG. 7, gas equipment having the flow rate QB is operated during a time period from the time $t_3$ to time $t_6$. The respective operation time periods with regard to the uses of equipment of flow rates QA and QC are measured in the similar manner.

An example of the ranks of flow rate ranked in the rank discriminator 18 is shown in Table 1.

TABLE 1

| Flow rate (liter per hour) | 0—21 | 21—210 | ... | maximum flow rate |
|---|---|---|---|---|
| Rank of flow rate | 1 | 2 | ... | n |

Referring to the Table 1, the flow rate may be ranked from rank 1 to rank n. The flow rate of the rank 1 is 0-21 liters per hour, and that of the rank 2 is from 21 to 210 liters per hour. Furthermore, predetermined allowable continuous consumption times with regard to the respective ranks of the flow rate are set in the initial condition setting means 7, as shown in Table 2.

TABLE 2

| Rank of flow rate | 1 | 2 | ... | n |
|---|---|---|---|---|
| Allowable continuous consumption time | 70 hours | 50 hours | ... | 10 hours |

Figure 8:
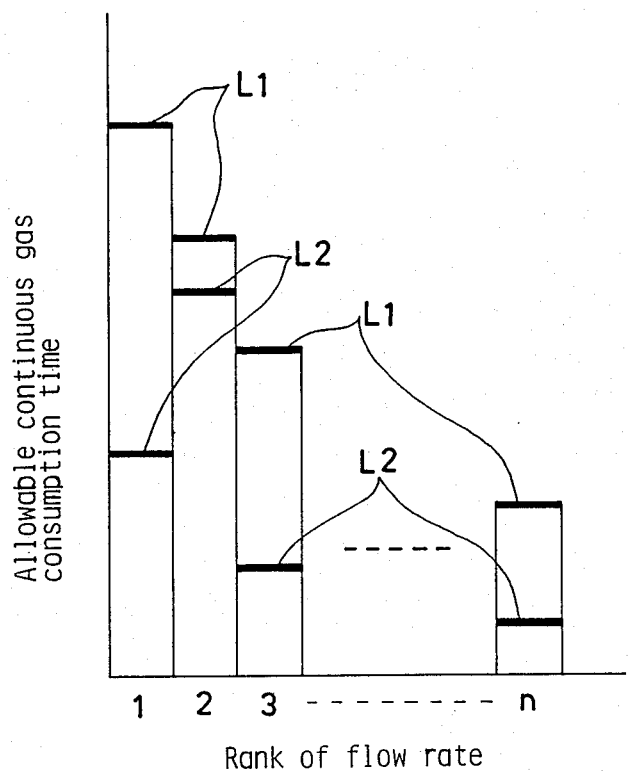
FIG. 8 is a graph showing a relation between ranks of the flow rate and allowable continuous times of gas consumption in the second embodiment.

FIG. 8 is a graph showing the allowable continuous gas consumption time periods with regard to the respective ranks of flow rate. Referring to FIG. 8, ranks of flow rate are graduated on the abscissa and allowable continuous gas consumption time periods are graduated on the ordinate. Horizontal lines L1 show the allowable continuous gas consumption time periods set in the initial condition setting means 7. Horizontal lines L2 show new allowable continuous gas consumption time periods, which are renewed in the varying means of normal condition of gas consumption 12.

Figure 9:
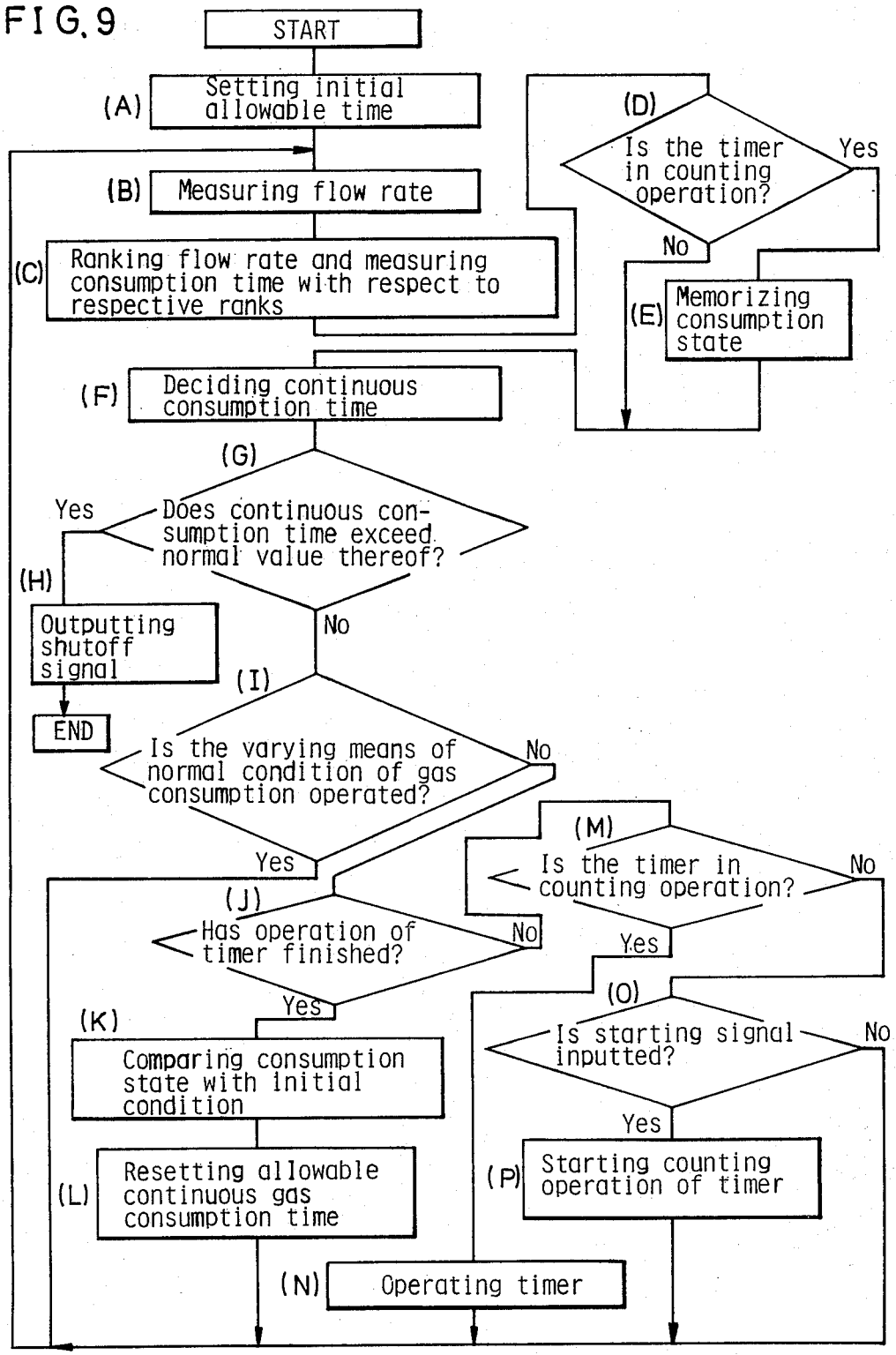
FIG. 9 is a flow chart showing an operation of the controller in the second embodiment.

FIG. 9 is a flow chart showing operation of the second embodiment as shown in FIG. 6. Referring to the flow chart, initially allowable continuous gas consumption time periods are set in the initial condition setting means 7 (Step A). A flow rate of the gas is detected (Step B). Continuous gas consumption times with respect to the respective ranks of flow rate are measured (Step C). The counting operation of the timer 9 is then examined (Step D). When the timer 9 is in counting operation, the data of the continuous gas consumption times with respect to the respective ranks of flow rate are memorized (Step E). Then, the continuous gas consumption time of each rank of flow rate is measured (Step F). When the continuous gas consumption time period exceeds the allowable continuous gas consumption time period (abnormal state), the shutoff signal is output (Steps G and H). When the continuous gas consumption time period is under the allowable continuous gas consumption time period (normal state), operation of the varying means of normal condition of gas consumption 12 is examined (Step I). If the operation is finished, steps of the operation return to Step B. If the operation of the varying means of normal condition of gas consumption 12 does not finish, the completion of the counting operation of the timer 9 is examined (Step J). When the counting operation of the timer 9 has finished, the gas consumption is compared with the initial condition set the initial condition setting means 7 (Step K), and the allowable continuous gas consumption time period is refreshed (Step L). After then, the value of allowable continuous gas consumption time period which has been set in Step L is used in the next successive continuous gas consumption time measurement in Step F. Furthermore, the step of the flow chart returns to Step B while the timer continues its counting operation (Steps J and M). If the timer 9 is not counting, the input of a starting signal is examined (Step O). When the starting signal is input, the timer 9 starts the counting operation (Step P). Meanwhile, the step returns to Step B in the absence of the starting signal.

Figure 10:
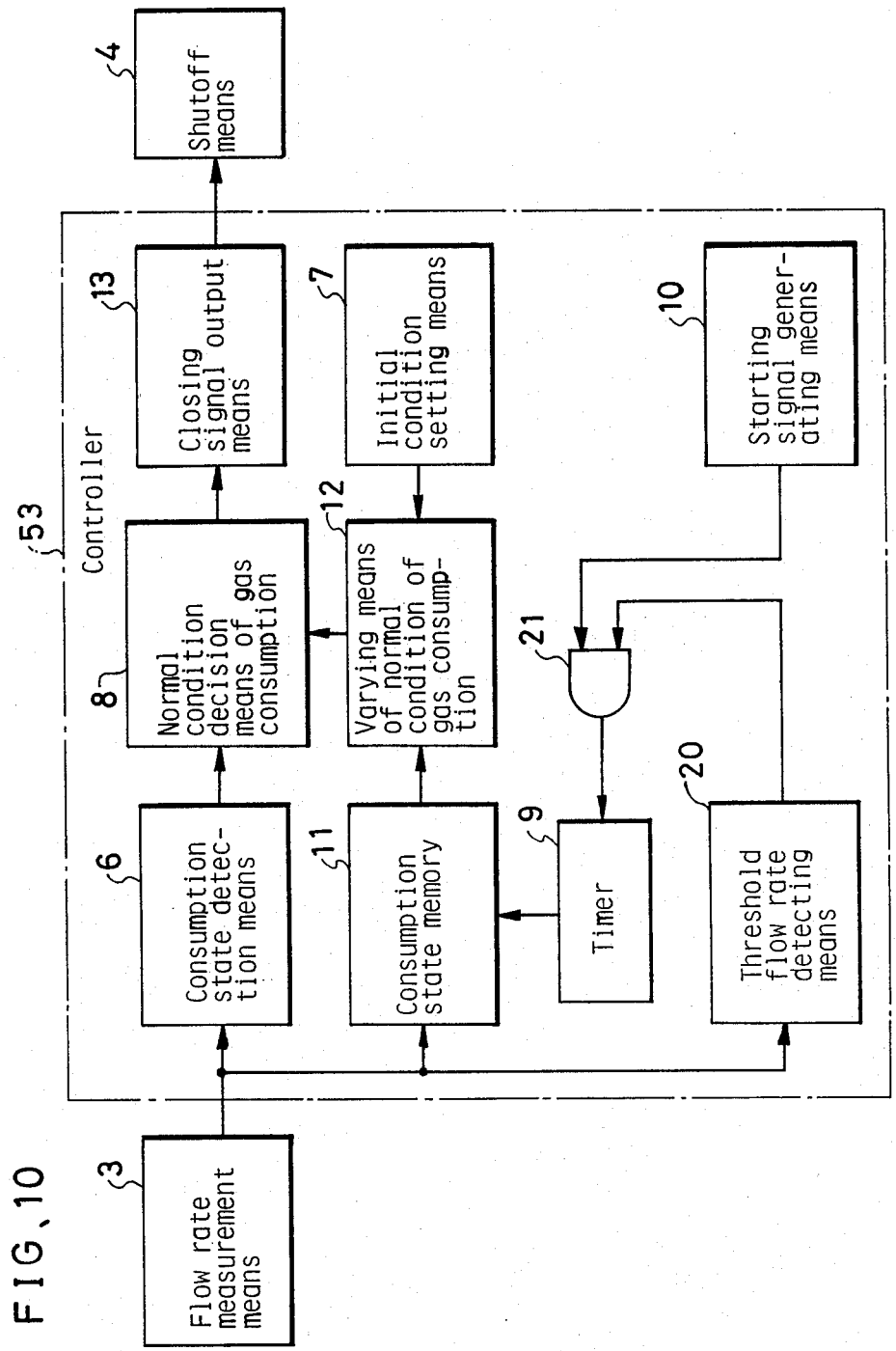
FIG. 10 is a block diagram of a controller in a third embodiment.

FIG. 10 is a block diagram of a third embodiment of the present invention. Referring to FIG. 10, means having the same reference numerals as shown in FIG. 2 are identical with those shown in FIG. 2, and hence the same descriptions thereof are applied. A threshold flow rate detecting means 20 outputs a signal when the flow rate exceeds a predetermined value. An AND gate 21 outputs a signal to the timer 9 when both the signal of the threshold flow rate detecting means 20 and the starting signal from the starting signal generating means 10 are input therein. The counting operation of the timer 9 is started by the output signal of the AND gate 21. The threshold flow rate is a minimum flow rate of gas equipment provided for the consumer. In the embodiment, the counting operation of the timer 9 starts on the basis of the start of operation of the gas equipment.

Figure 11:
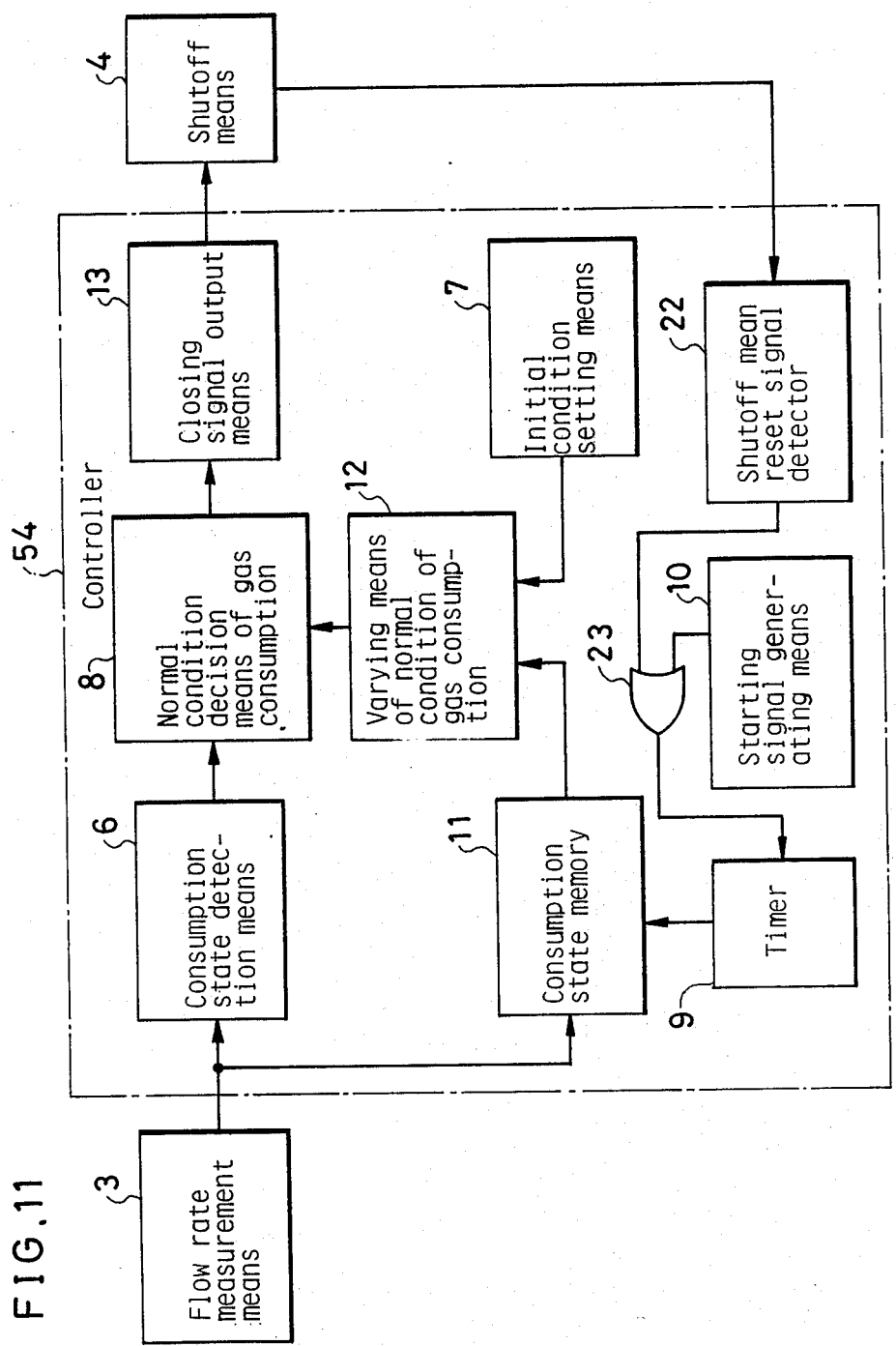
FIG. 11 is a block diagram of a controller in a forth embodiment.

FIG. 11 is a block diagram of a fourth embodiment of the present invention. Referring to FIG. 11, means having the same reference numerals as shown in FIG. 2 are identical with what is shown in FIG. 2, and hence the same descriptions thereof are applied. In the embodiment, after shutoff of the gas supply in the tube 1 by operation of the gas shutoff means 4, when the shutoff means 4 is opened by manual operation, a reset signal is issued from the shutoff means 4. A shutoff-means-reset-signal-detector 22 detects the reset signal. An output signal of the shutoff-means-reset-signal-detector 22 is input to the timer 9 through an OR gate 23. Therefore, when the shutoff means 4 is operated during the counting operation of the timer 9, the count of the timer 9 is cleared and operation of the consumption-state memory 11 is interrupted by the signal from the shutoff-means-reset-signal-detector 22. The signal also acts to start the timer 9 like the starting signal of the starting signal generating means 10.

Figure 12:
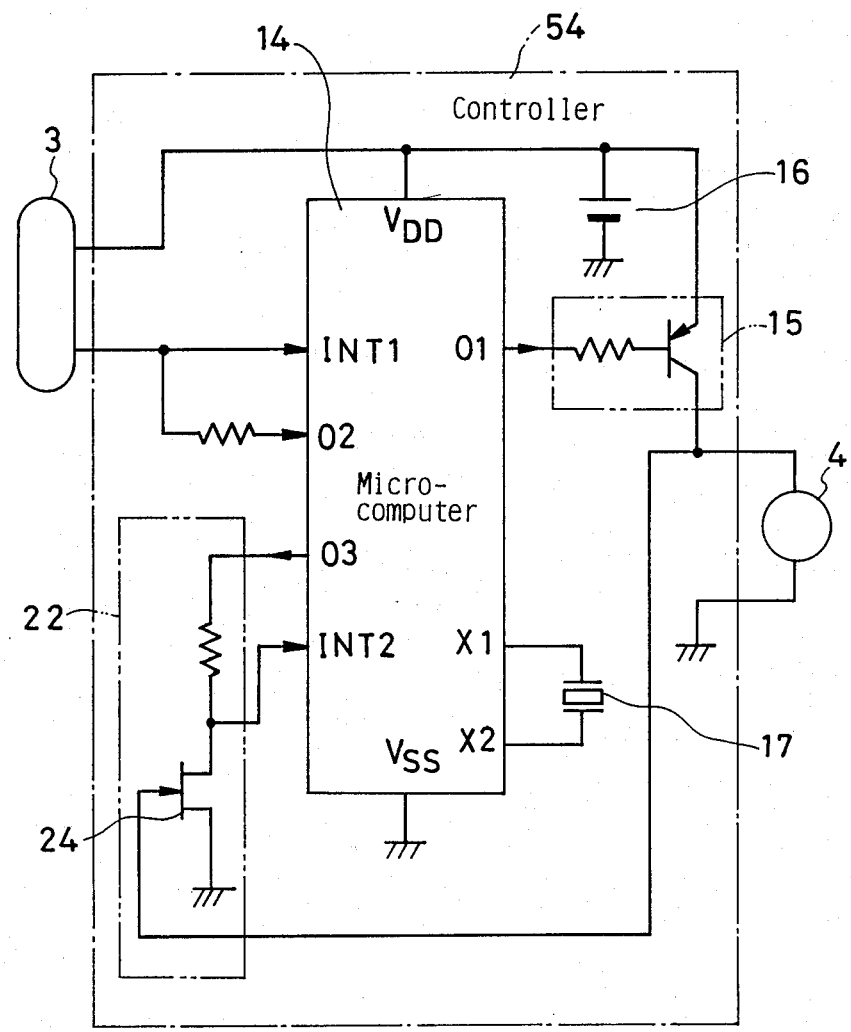
FIG. 12 is a circuitry of the controller of the forth embodiment.

FIG. 12 is a detailed circuit of the controller 54 as shown in FIG. 11. Referring to FIG. 12, means having the same reference numerals as shown in FIG. 3 are identical with what is shown in FIG. 3. The shutoff-means-reset-signal-detector 22 comprises a resistor and an N-channel FET 24. A shutoff device having a permanent magnet, a magnetic coil and a spring for holding its opening state are used as the shutoff means 4, for example. In the shutoff operation of the shutoff device, an electric pulse is applied to the magnetic coil so as to generate a magnetic force having a reverse magnetic pole to that of the permanent magnet. Then, the shutoff state of the shutoff device is held by the force of the spring. Reopening of the shutoff device is accomplished by manual operation, for example. In the operation, a counter electromotive force is generated in the magnetic coil, and an electric potential owing to the counter electromotive force is applied to the gate of the conjunction type N-channel FET 24 of the shutoff-means-reset-signal-detector 22. The FET 24 is in its OFF state while the electric potential is smaller than the cutoff voltage of the N-channel FET 24. Then, an input voltage is applied to the input terminal INT 2 of the microcomputer 14, since electric potential of the output terminal $O_3$ of the microcomputer 14 is at high level.

Figure 13B:
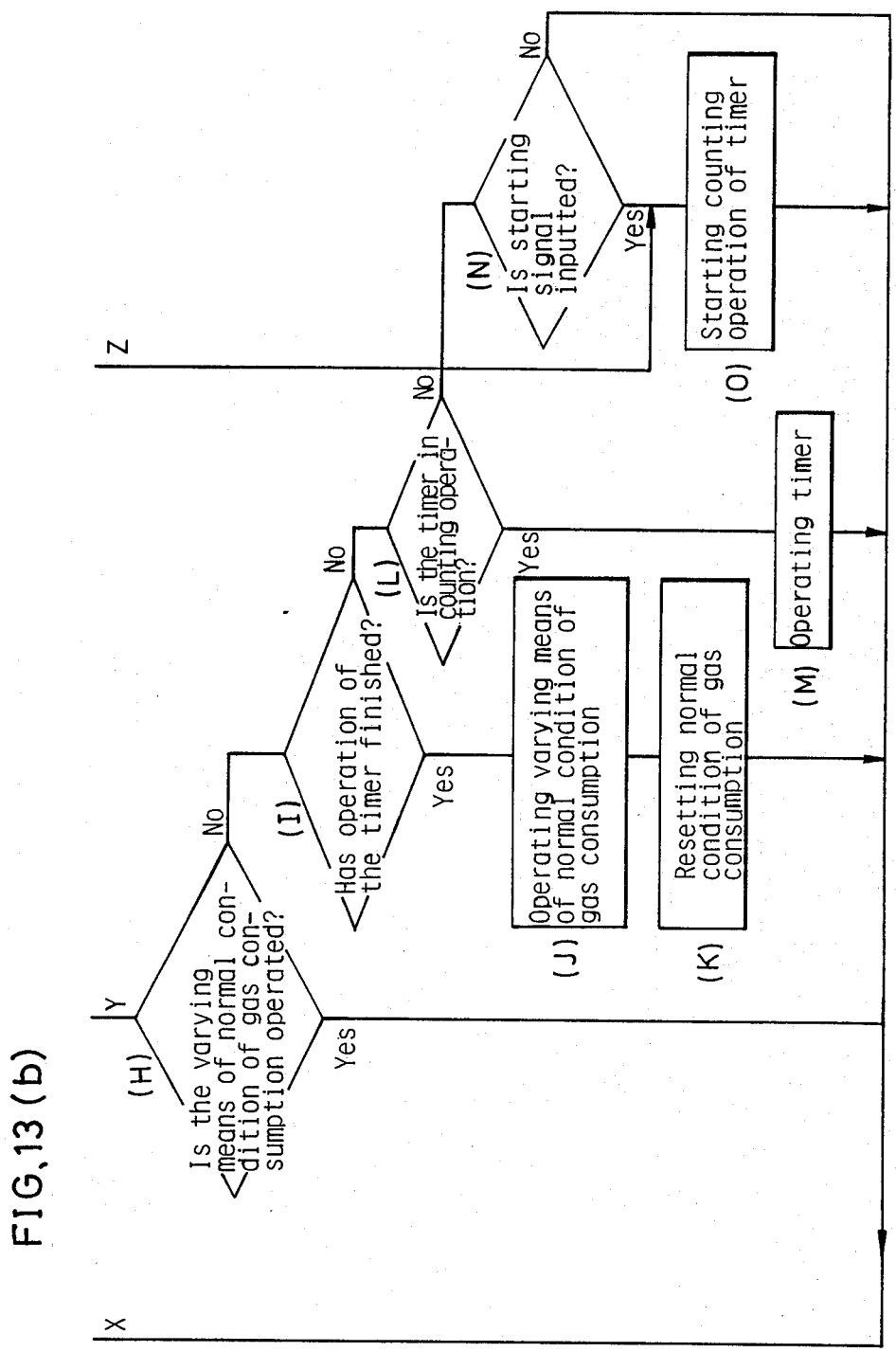

FIG. 13(a), FIG. 13(b) and FIG. 13(c) show a flow chart showing an operation of the controller 54 as shown in FIG. 11. Description of the steps which are identical with what is made on FIG. 4 is omitted. When an abnormal state, wherein a consumption state exceeds the normal condition of gas consumption, is detected in Step F, the closing signal is output to the shutoff means 4 (Step G). Subsequently, the counting operation of the timer 9 is examined (Step P). If the timer 9 is counting, the count of the timer 9 is cleared (Step Q). Furthermore, operation of the consumption-state memory 11 is interrupted (Step R). When the timer 9 is not counting (Step P), Steps Q and R are skipped. Subsequently, the reset signal is detected (Step S). When the reset signal is not evident, the gas consumption is examined (Step U). In this state, the flow in the gas supply tube 1 is closed by operation of the shutoff means 4 (Step G). But, when the flow rate is detected in spite of the closing operation of the shutoff means 4, the shutoff signal is issued again (Step G). Then when the flow rate is not detected, input of the reset signal is monitored (Step S). In case the reset signal has been issued, the operation of the consumption-state memory 11 is examined to determine whether its operation has been interrupted (Step T). And when the operation of the state 11 is interrupted, the timer 9 again starts counting (Steps O). If the consumption-state memory 11 is in continuous operation, the step returns to step A and the flow rate is measured (Step A).

Figure 14:
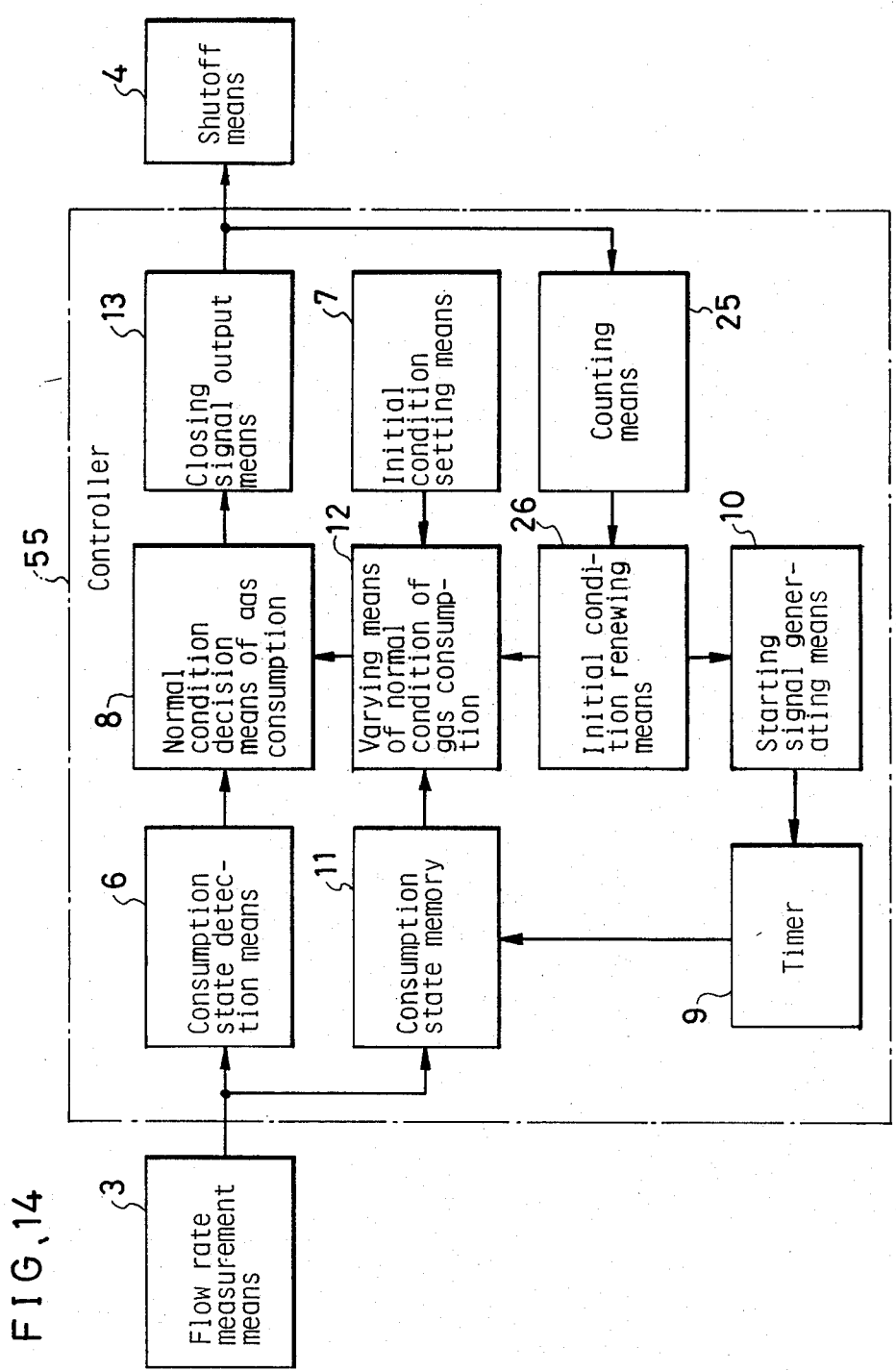
FIG. 14 is a block diagram of a controller in a fifth embodiment.

FIG. 14 is a block diagram of a fifth embodiment of the present invention. Referring to FIG. 14, means having the same reference numerals as shown in FIG. 2 are identical with what are shown in FIG. 2, and hence the same descriptions thereof are applied. In the embodiment, a counting means 25 memorizes the numbers of occurrences of the abnormal state causing operation of the shutoff means 4 and classifies with respect to the flow rate and continuous time period, respectively, after reset of a normal condition of gas consumption in the varying means of normal condition of gas consumption 12. Furthermore, an initial condition renewing means 26 renews the initial condition in the initial condition setting means 7 on the basis of a flow rate and continuous time period in the abnormal state, when numbers counted by the counting means 25 reach a predetermined number, and operation of the timer 9 starts.

Figure 15A:
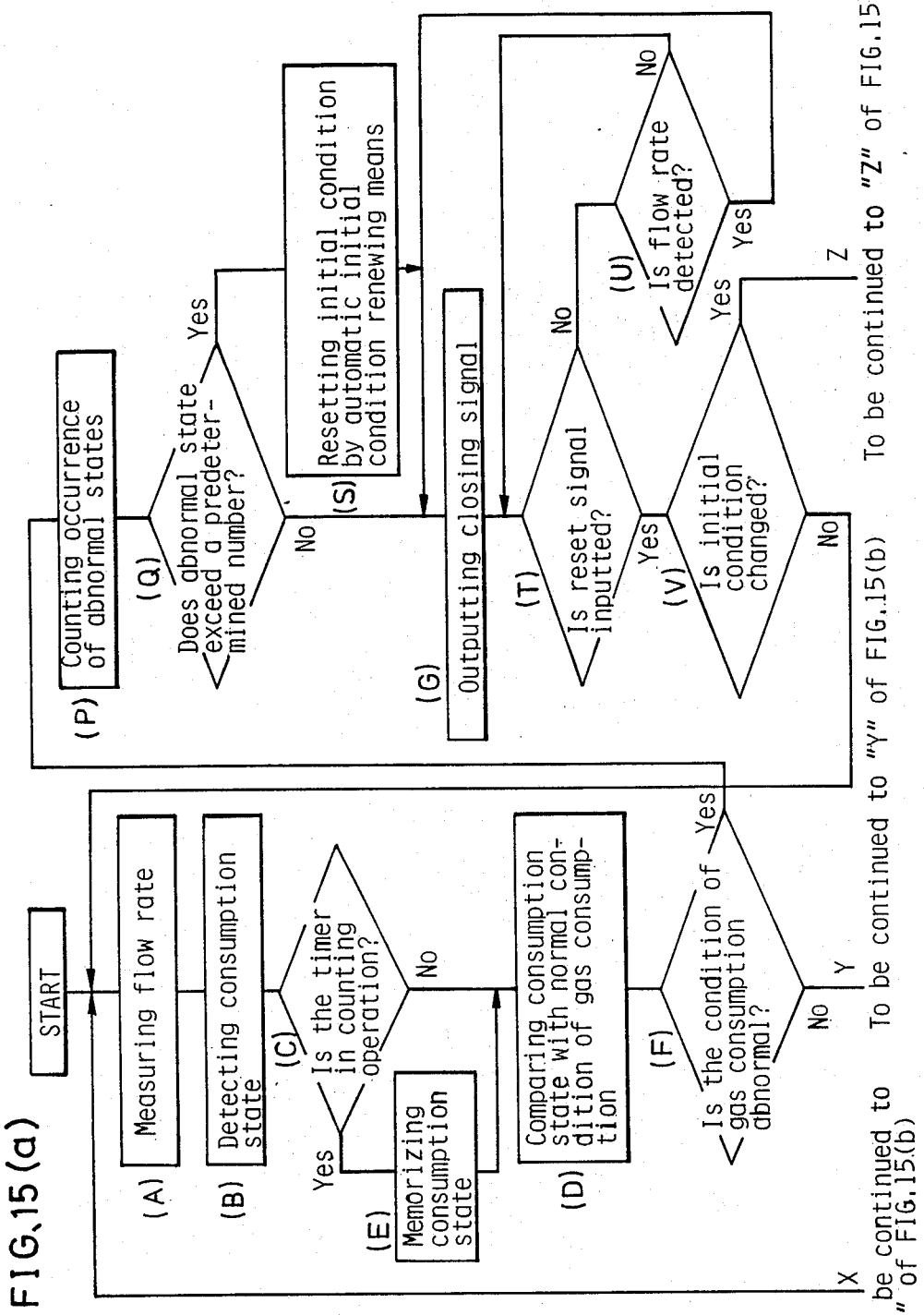
Figure 15B:
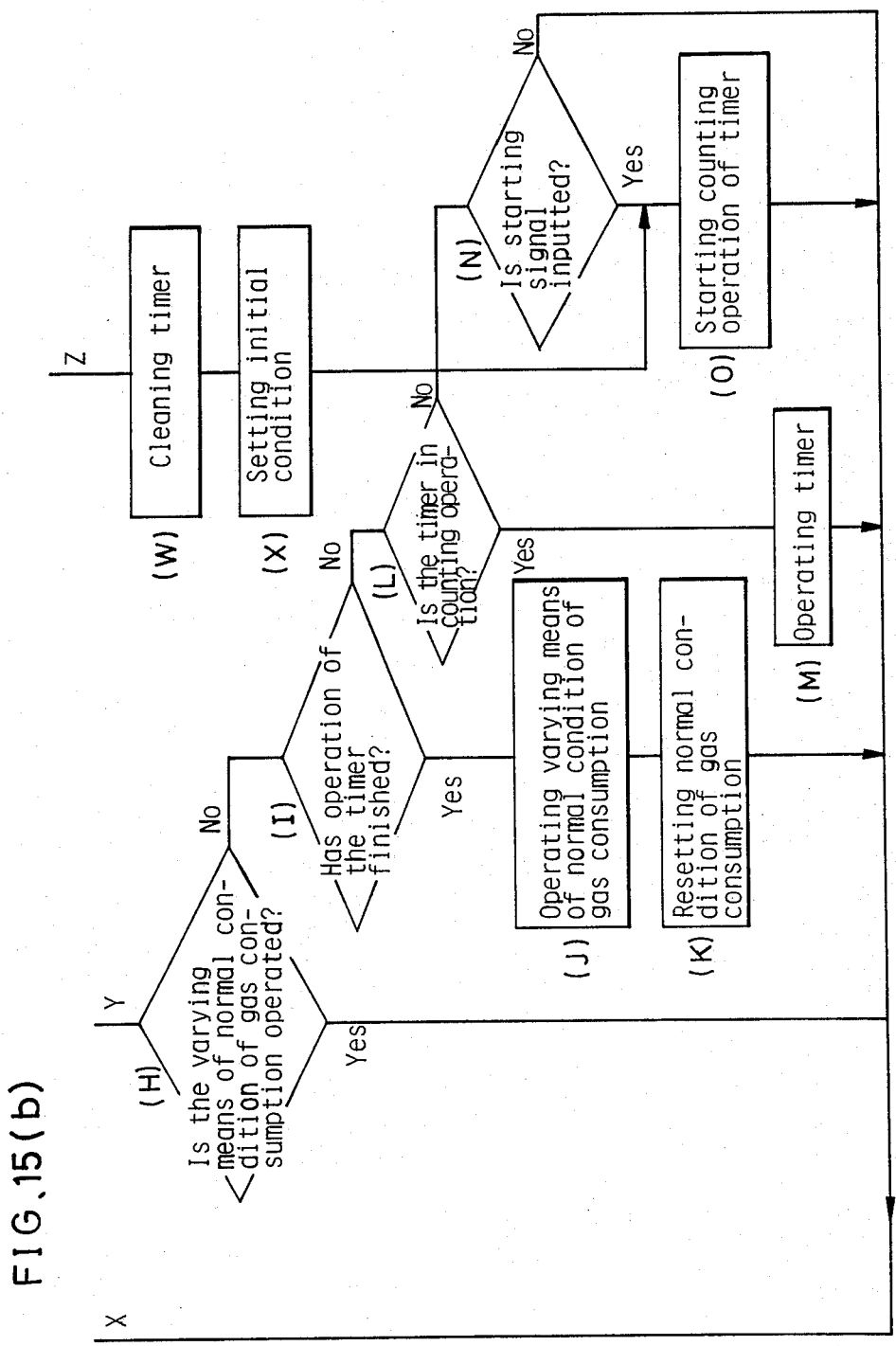

FIG. 15(a), FIG. 15(b) and FIG. 15(c) shows a flow chart showing operation of the controller 55 as shown in FIG. 14. The flow rate is measured by the flow rate measurement means 3 (Step A). The consumption state is detected by the consumption state detection means 6 (Step B). The operation of the timer 9 is examined by the starting signal generating means 10 (Step C). When the timer 9 is in counting operation, the consumption state is memorized in the consumption-state memory 11, and the consumption state is always replaced with a new maximum consumption state (Step E). When the starting signal generating means 10 is not operated and the timer 9 is also not operated, the consumption state, detected by the consumption state detection means 6, is compared with the normal condition of gas consumption in the normal condition decision means of gas consumption 8 (Step D). As a result, when the consumption state is over a predetermined normal condition of gas consumption, the consumption state is recognized as an abnormal state (Step F) and occurrence of the abnormal state is counted with respect to the flow rate and the continuous time period, respectively (Step P). When the consumption state is within the normal condition of gas consumption, if the varying means of normal condition gas consumption 12 is operated (Step H), the flow of the flow chart is returned to Step A, and measurement of the flow rate is repeated. When the varying means of normal condition of gas consumption 12 is not operated in the normal condition of the gas consumption, if the counting operation of the timer 9 is finished, the varying means of normal condition of gas consumption 12 is operated (Steps I and J).

Furthermore, the maximum value of the consumption state memorized in the consumption-state memory 11 is compared with the initial condition of the initial condition setting means 7, and a smaller one thereof is memorized in the varying means of normal condition of gas consumption 12 (Step K). After the abovementioned varying process of the normal condition of gas consumption, a consumption state, detected by the consumption state detection means 6, is compared with the new normal condition of gas consumption (Step D). Subsequently, the completion of the counting operation of the timer 9 is examined (Step L). When the timer 9 is counting, the flow of the flow chart is returned to the Step A through the Step M. When the timer 9 has finished the counting operation, the occurrence of an input of a starting signal is examined (Step N). The counting operation of the timer 9 is started by input of the starting signal (Step O). When the starting signal not input, the flow of operation is returned to Step A.

Once a decision of abnormal condition is made, the numbers of occurrences of the abnormal states of the flow rate and the continuous time is counted (Step P) to reach a predetermined number of occurrences (Step Q). Furthermore, the initial condition set in the initial condition setting means 7 is changed by the initial condition renewing means 26 (Step S) and the closing signal is given to the shutoff means 4 to interrupt the flow of the gas (Step G). On the other hand, when the respective numbers of occurrence of the abnormal states are far from the predetermined number, the closing signal is issued (Step G). Then, the occurrence of an input of a reset signal is examined (Step T). When the reset signal is not input, the flow rate of the gas is detected (Step U). When the flow rate is not zero, the closing signal is the occurrence of an output. When the flow rate is zero, input of the reset signal is examined (Step T). When the reset signal is output, the occurrence of a change in the initial condition is examined (Step V). When the initial condition has changed, the timer 9 is cleared (Step W). Moreover, the initial condition is set in the initial condition setting means 7 (Step X), and subsequently, the counting operation of the timer 9 starts (Step O). When the initial condition is not set in Step V, the flow of the flow chart returns to measurement of the flow rate (Step A).

As mentioned above, after setting the new normal condition of gas consumption by operation of the initial condition renewing means 26, when the predetermined number of shutoff operations due to the same abnormal states of the flow rate and continuous time occur, a new gas consumption state is automatically formed based on a belief that the preceding normal condition of gas consumption changed by the initial condition renewing means 26, is out of order with practical use. In this manner, the embodiment of the gas shutoff apparatus is capable of coping with a change in gas consumption due to an addition of gas equipment.

Figure 16:
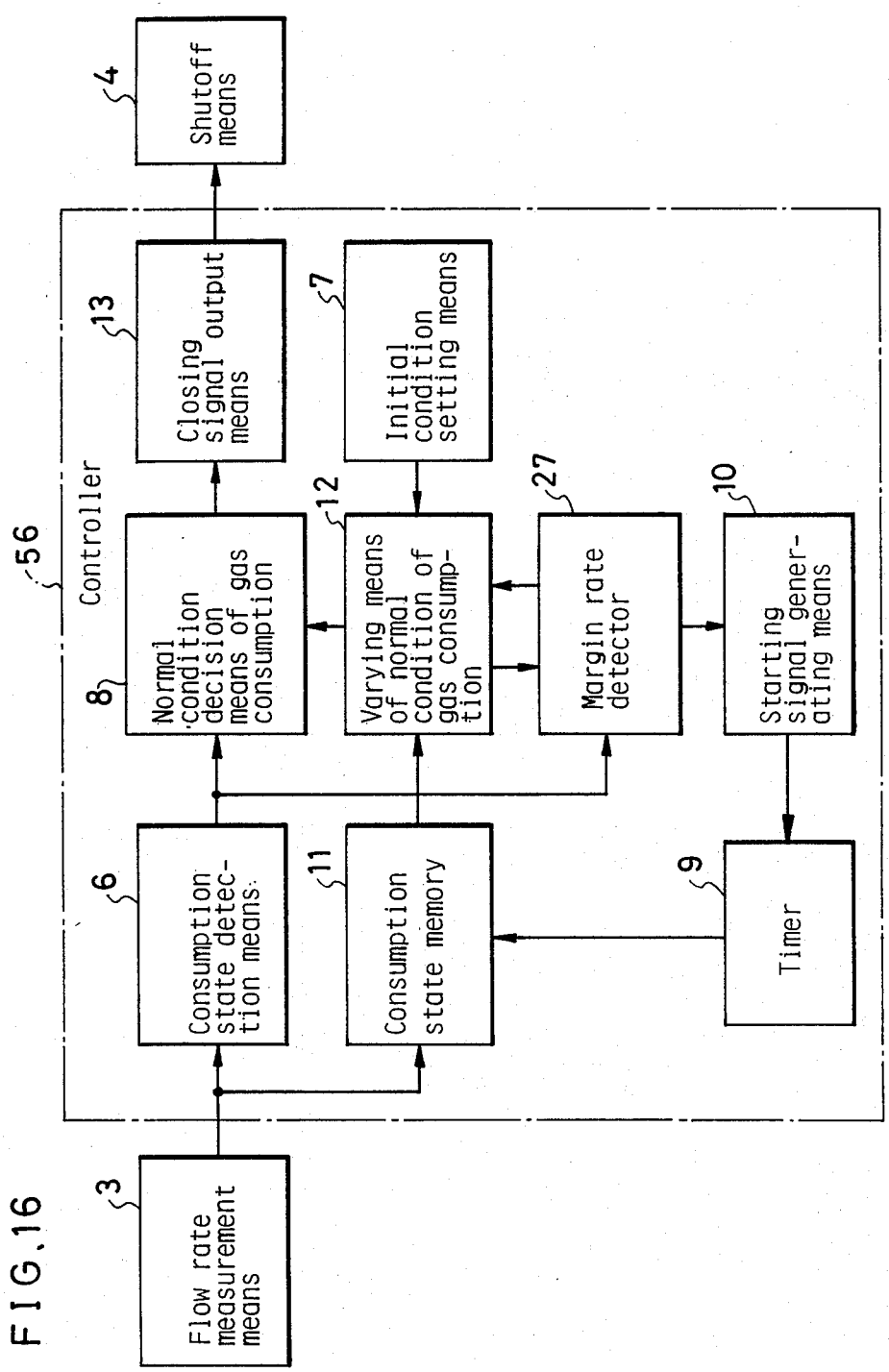
FIG. 16 is a block diagram of a controller in a sixth embodiment.

FIG. 16 is a block diagram of a controller 56 of a sixth embodiment. Referring to FIG. 16, means having the same reference numerals as shown in FIG. 2 are identical with that of FIG. 2, and hence the same descriptions thereof are applied. The controller 56 in the sixth embodiment comprises a margin rate detector for detecting a margin rate which is shown by a ratio the normal condition of gas consumption to a consumption state. When an output signal of the margin rate detector 27 deviates from a predetermined range, the timer 9 is started, to observe the gas consumption pattern corresponding to the consumption state.

Figure 17:
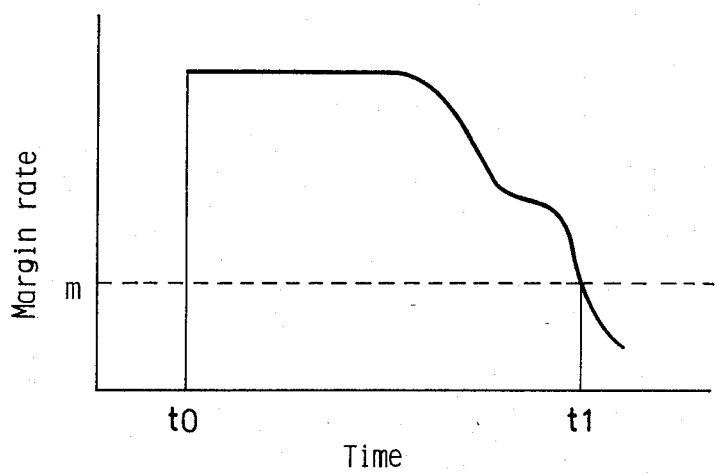
FIG. 17 is a graph showing a relation between a margin rate and a time in the sixth embodiment.

FIG. 17 is a graph showing a relation between the margin rate and the lapse time. In the graph, the abscissa is graduated by a lapse time and the ordinate is graduated by the margin rate. At time t0, the normal condition of gas consumption is set and operation of the margin rate detector 27 starts. A predetermined margin rate m is plotted by a horizontal dotted line. The margin rate is higher than the predetermined margin rate m from t0 to t1. After the time t1, the margin rate is lower than the predetermined margin rate m. The starting signal generating means 10 is operated again at the time t1 or after a lapse of a predetermined time period wherein the margin rate is under the predetermined margin rate m. Thereby, a new gas consumption state is set in the varying means of normal condition of gas consumption 12.

In the above-mentioned example, the margin rate is selected to be lower than the predetermined margin rate m. But, the present invention is applicable in such a case that, on the contrary, the margin rate is exceeding a predetermined margin rate, also by using the margin rate detector 27 in accordance with the present invention. For instance, when a portion of the gas equipment is abandoned, the normal condition of gas consumption is reduced by the initial condition renewing means 26.

As mentioned above, the normal condition of gas consumption which is suitable to an actual use can be set before operation of the shutoff means by mean of the initial condition renewing means 26 on the basis of operation of the margin rate detector 27. As a result, the consumer of the gas shutoff apparatus, in accordance with the present invention, can add or decrease gas equipment without occurrence of gas interruption. Furthermore, safety is assured and convenience is improved.

Figure 18:
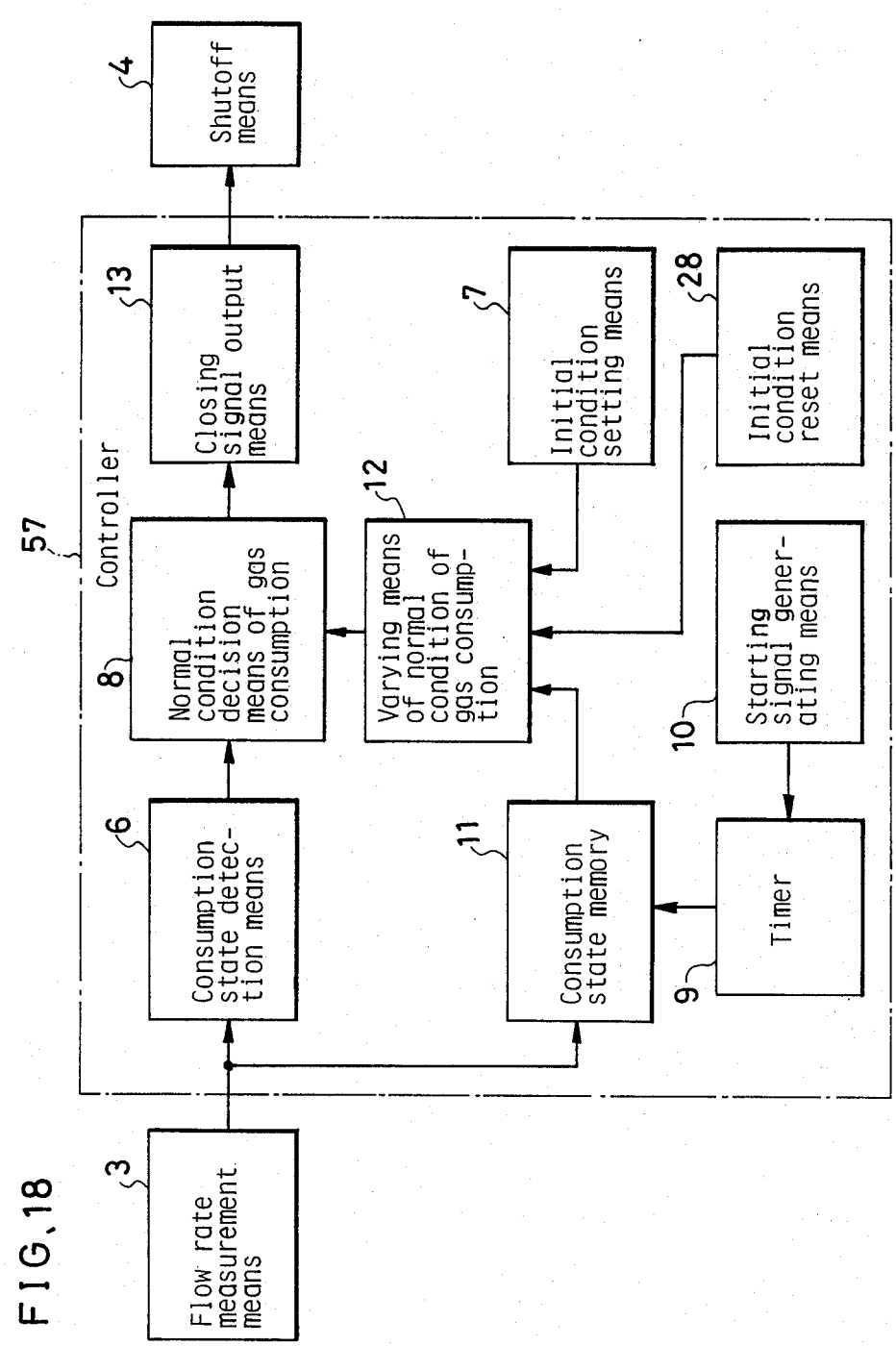
FIG. 18 is a block diagram of a controller in a seventh embodiment in accordance with the present invention.

FIG. 18 is a block diagram of a controller 57 of a seventh embodiment. Referring to FIG. 18, means having the same reference numerals as shown in FIG. 2 are identical with that of FIG. 2, and hence the same descriptions thereof are applied. In the embodiment, the controller 57 comprises an initial condition reset means 28 for returning the condition of gas consumption set by the varying means of normal condition of gas consumption 12 to the initial condition. The initial condition reset means 28 comprises a switch, for example, and is controlled by a microcomputer. Then, in case of a lot of gas being temporarily consumed, the gas shutoff apparatus is operable without unexpected shutoff by holding the reference value, which is larger than the consumption state and reset by the initial condition reset means 28 in a predetermined time period by a timer.

What is claimed is:

1. A gas shutoff apparatus comprising:
   flow rate measurement means for generating a flow rate signal corresponding to a flow rate of a gas in a gas supply tube,
   initial condition setting means, comprising a manual input device, for presetting a normal condition of gas consumption given by said flow rate signal and by a consumption time of the gas on the basis of said flow rate signal,
   processing means for 1) detecting a consumption state identified by said flow rate and said consumption time, (2) comparing said consumption state to a normal condition of gas consumption, and (3) generating a shutoff signal if said consumption state deviates from said normal condition of gas consumption,
   timer means for measuring a predetermined time period,
   starting signal generating means for starting said timer,
   consumption-state memory means for memorizing said consumption state of the gas of the basis of said flow rate signal during operation of the timer,
   varying means of normal condition of gas consumption for modifying said normal condition of gas consumption in response to changes in said consumption state in the consumption-state memory, and
   shutoff means for interrupting said gas supplying pipe line by said shutoff signal.

2. A gas shutoff apparatus in accordance with claim 1, wherein
   said processing means detects a flow rate of one or more pieces of gas equipment, a value corresponding to said flow rate being preset in the initial condition setting means as an initial value, and said consumption-state memory memorizing the flow rate of the one or more pieces of gas equipment.

3. A gas shutoff apparatus in accordance with claim 1, wherein
   said processing means detects a variation in flow rate over a predetermined change of flow rate, a value of at least the maximum flow rate associated with gas equipment having a maximum gas consumption being preset in said initial condition setting means when said variation exceeds said predetermined change, and said consumption-state memory memorizing the variation of flow rate over said predetermined change of the flow rate.

4. A gas shutoff apparatus in accordance with claim 1, wherein
   said processing means also (4) divides a predetermined range of said flow rate into plural ranks and determines a rank of each flow rate and (5) measures continuous consumption time periods with respect to the respective ranks,
   said initial condition setting means presetting allowable continuous gas consumption time periods with respect to the respective ranks as initial conditions, and
   said consumption-state memory means memorizing said continuous consumption times periods with regard to the respective ranks during operation of the timer.

5. A gas shutoff apparatus in accordance with claim 4, wherein
   said consumption-state memory simultaneously memorizes the continuous consumption time periods of the respective ranks of the flow rate.

6. A gas shutoff apparatus in accordance with claim 1, wherein
   said timer means for counting when a flow rate signal exceeding a predetermined value is input to said timer after said starting signal of said starting signal generating means is input to said timer.

7. A gas shutoff apparatus in accordance with claim 1 further comprising:
   a shutoff-means-reset-signal-detector means for detecting the opening operation of the shutoff means, closed by said shutoff signal, wherein;
   when the shutoff means is closed during the counting operation of the timer, the timer is cleared and operation of the consumption-state memory is stopped and a signal of the shutoff-means-reset-signal-detector is given to the timer as a starting signal.

8. A gas shutoff apparatus in accordance with claim 1 further comprising;
   counting means for memorizing a number of occurrences of abnormal states with respect to the respective flow rates and continuous times, after said modification of said normal condition of gas consumption in the varying means of normal condition of gas consumption, and
   initial condition renewing means for starting said timer and resetting an initial condition on the basis of said respective flow rates and continuous times.

9. A gas shutoff apparatus in accordance with claim 1 wherein:
   said processing means also for detecting and outputting a margin rate showing a ratio of said normal condition of gas consumption to said consumption state, wherein;
   said timer means is started to observe a gas consumption state corresponding to said respective flow rates and continuous times periods when said margin signal of said processing means deviates from a predetermined range.

10. A gas shutoff apparatus in accordance with claim 1 further comprising;
    initial condition reset means for changing the consumption state set in the varying means of normal condition of gas consumption to said initial condition.

* * * * *